US008232936B2

(12) United States Patent
Ozawa et al.

(10) Patent No.: US 8,232,936 B2
(45) Date of Patent: Jul. 31, 2012

(54) ELECTRONIC CIRCUIT, METHOD OF DRIVING THE SAME, ELECTRO-OPTICAL DEVICE, AND ELECTRONIC APPARATUS

(75) Inventors: Tokuro Ozawa, Suwa (JP); Ryoichi Nozawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 664 days.

(21) Appl. No.: 12/379,036

(22) Filed: Feb. 11, 2009

(65) Prior Publication Data

US 2009/0160840 A1 Jun. 25, 2009

Related U.S. Application Data

(63) Continuation of application No. 10/923,725, filed on Aug. 24, 2004, now Pat. No. 7,508,362.

(30) Foreign Application Priority Data

Sep. 17, 2003 (JP) ................................ 2003-324630

(51) Int. Cl.
*G09G 3/30* (2006.01)
*G09G 3/36* (2006.01)
*G06F 3/038* (2006.01)

(52) U.S. Cl. ............ 345/76; 345/211; 345/92; 345/204

(58) Field of Classification Search .................... 345/55, 345/76, 211, 204, 92

See application file for complete search history.

(56) References Cited

U.S. PATENT DOCUMENTS

| | | | | |
|---|---|---|---|---|
| 6,229,506 | B1 * | 5/2001 | Dawson et al. | 345/82 |
| 6,577,302 | B2 * | 6/2003 | Hunter et al. | 345/204 |
| 7,786,959 | B2 * | 8/2010 | Numao | 345/76 |
| 2001/0026251 | A1 * | 10/2001 | Hunter et al. | 345/55 |
| 2002/0195968 | A1 * | 12/2002 | Sanford et al. | 315/169.3 |
| 2002/0196212 | A1 * | 12/2002 | Nishitoba et al. | 345/76 |
| 2003/0122745 | A1 * | 7/2003 | Miyazawa | 345/76 |
| 2004/0207579 | A1 * | 10/2004 | Matsumoto | 345/76 |
| 2004/0239661 | A1 * | 12/2004 | Jo | 345/204 |
| 2005/0104814 | A1 | 5/2005 | Choi et al. | |

FOREIGN PATENT DOCUMENTS

JP A-2003-177709 6/2003

* cited by examiner

*Primary Examiner* — Bipin Shalwala
*Assistant Examiner* — Benyam Ketema
(74) *Attorney, Agent, or Firm* — Oliff & Berridge, PLC

(57) ABSTRACT

To reduce time for writing a target voltage in the gate of a driving transistor. In a first period, a transistor 211 is switched on to allow a driving transistor 210 to function as a diode and transistors 212 and 213 are switched on to electrically connect the drain of the driving transistor 210 to a data line 112, to which an initial voltage is applied, such that the initial voltage is applied to the gate of the driving transistor 210. In a second period, a transistor 212 is switched off such that the gate of the driving transistor 210 is maintained to have an off voltage corresponding to the power source. In a third period, the transistor 211 is switched off such that the voltage of the data line 112 is converted into a grayscale voltage to maintain the gate of the driving transistor at the target voltage. In a fourth period, the driving transistor 210 flows the current corresponding to the maintained gate voltage to an OLED element 230.

17 Claims, 12 Drawing Sheets

(1) INITIALIZATION (2) OFF VOLTAGE DETERMINING OPERATION

COMPLETION OF OFF VOLTAGE DETERMINATION (3) WRITING OF TARGET VOLTAGE (4) LIGHT EMISSION PERIOD

ELECTRONIC CIRCUIT, METHOD OF DRIVING THE SAME, ELECTRO-OPTICAL DEVICE, AND ELECTRONIC APPARATUS

This is a Continuation of application Ser. No. 10/923,725 filed Aug. 24, 2004, which claims the benefit of Japanese Application No. 2003-324630 filed Sep. 17, 2003. The disclosure of the prior applications is hereby incorporated by reference herein in its entirety.

BACKGROUND OF THE INVENTION

1. Field of Invention

The present invention relates to an electronic circuit for driving a current-driven element such as an organic light emitting diode element, a method of driving the same, an electro-optical device, and an electronic apparatus.

2. Description of Related Art

Attention is paid to an organic light emitting diode (hereinafter, referred to as OLED) element as a next generation light emitting device that replaces a liquid crystal element. The OLED element is referred to as an organic electroluminescent element or a field emission polymer. Since the OLED element is a spontaneous emission type, it has less dependency on a viewing angle. Also, since the OLED element does not need back light or reflected light, it consumes less power and is made thinner. As a result, the OLED element has good characteristics as a display panel.

Here, the OLED element is a current type element to be driven that does not have a voltage storage property unlike a liquid crystal element and that cannot maintain a light emitting state when current is interrupted. Thus, when the OLED element is driven by an active matrix method, a voltage storage element such as a capacitor is inserted between the gate of a driving transistor that supplies current to the OLED element and an electrostatic potential line and a voltage corresponding to the grayscales of pixels is written in the gate of the driving transistor during a selection period. According to such structure, since the gate voltage is stored in a non-selection period due to the capacitor of the driving transistor, it is possible to continuously flow current corresponding to the corresponding gate voltage to the corresponding OLED element.

According to such structure, since the threshold voltage characteristic of the driving transistor is not uniform, the brightness of the OLED element varies in each pixel circuit, which deteriorates the quality of displayed images. Thus, recently, a technology of connecting the driving transistor to a diode to perform programming such that current flows from the driving transistor to data lines and such that a target voltage corresponding to the current to flow through the OLED element is written in the gate of the driving transistor to compensate for non-uniformity of the threshold voltage characteristic of the driving transistor (for example, refer to Patent documents 1 and 2)

[Patent Document 1] U.S. Pat. No. 6,229,506 (refer to FIG. 2)

[Patent Document 2] Japanese Unexamined Patent Application Publication No. 2003-177709 (refer to FIG. 3)

SUMMARY OF THE INVENTION

However, in the case where the driving transistor is a P-channel-type, when the target voltage is high, it is difficult for the drain voltage of the driving transistor to increase due to the parasitic capacitance of the data lines. Thus, it takes long for the gate of the driving transistor diode-connected to have the target voltage. As a result, a new problem occurs in that the target voltage cannot be written in a selected period.

In order to solve the above-described problems, it is an object of the present invention to provide an electronic circuit capable of rapidly writing a target voltage corresponding to the amount of current to flow through an element to be driven in the gate of a driving transistor, a method of driving the same, an electro-optical device using the electronic circuit, and an electronic apparatus.

The present invention provides a method of driving an electronic circuit. The electrode circuit comprises an element to be driven inserted into a path of a power source, a driving transistor inserted into the path for controlling the amount of current flowing through the path, a first switching element switched on or off between the gate and drain of the driving transistor, and a voltage storage element, its one end being connected to the gate of the driving transistor. The method of driving an electronic circuit comprises a first period step of switching on the first switching element and of electrically connecting the drain or gate of the driving transistor to an initial voltage supply line, to which an initial voltage is applied, to apply the initial voltage to the drain and gate of the driving transistor, a second period step of disconnecting electrical connection between the drain or gate of the driving transistor and the initial voltage supply line and of maintaining the switching on of the first switching element to maintain the gate of the driving transistor to have a voltage corresponding to the power source, a third period step of switching off the first switching element and of maintaining the gate of the driving transistor to have a target voltage corresponding to the amount of current to flow to the element to be driven, and a fourth period step of allowing the driving transistor to flow current in accordance with the maintained gate voltage to the element to be driven. According to the present invention, the initial voltage is written in the corresponding driving transistor in a state where the driving transistor is diode-connected and the target voltage is written in the gate of the driving transistor in a state where the diode-connection is cancelled. Thus, it is possible to reduce the time required for writing the target voltage. Here, the initial voltage preferably corresponds to a voltage in which the value of the current flowing through the element to be driven is zero or substantially zero when the initial voltage is applied to the gate of the driving transistor in the fourth period. In the first period step, when both ends of the voltage storage element are short-circuited or when the other end of the voltage storage element is electrically isolated from one end of the voltage storage element, the function of the voltage storage element is nullified. Thus, it is possible to reduce the time required for writing the initial voltage in the gate of the driving transistor.

In order to accomplish the above object, the electronic circuit according to the present invention comprises an element to be driven inserted into a path of a power source, a driving transistor inserted into the path for controlling the amount of current flowing through the path, a first switching element switched on in first and second periods and switched off in third and fourth periods between the gate and drain of the driving transistor, a voltage storage element, its one end being connected to the gate of the driving transistor, a second switching element inserted between an initial voltage supply line, to which an initial voltage is applied, and the drain of the driving transistor, switched on in the first period to apply the initial voltage to the drain or gate of the driving transistor, and switched off in the second, third, and fourth periods, and a third switching element switched on at least in the third period between a signal line, to which a voltage corresponding to the amount of current to flow to the element to be driven is applied, and the other end of the voltage storage element, to apply the voltage of the signal line to the other end of the voltage storage element. According to this electronic circuit, the initial voltage is written in the gate of the driving transistor in a state where the driving transistor is diode-connected and the target voltage is written in the gate of the driving transistor in a state where connection to the diode is cancelled. Thus, it is possible to reduce the time required for writing the target voltage.

In this electronic circuit, the third switching element is preferably a transistor, whose gate is connected to a scanning line and which is switched on when the corresponding scanning line is selected. According to this structure, since the operation in the first and second periods can be performed prior to the third period in which the scanning line is selected, it is possible to secure enough time.

It is preferable that this electronic circuit further comprise a data line used as the initial voltage supply line and the signal line, that the initial voltage be applied to the data line in the first period such that a voltage corresponding to the amount of current to flow to the element to be driven is applied to the data line in the latter half of the third period, that the third switching element be also switched on in the first period, and that the second switching element connects the drain of the driving transistor to the data line through the third switching element switched on in the first period. According to this structure, it is possible to reduce the number of switching lines of the electronic circuit and the number of wiring lines to the electronic circuit.

This electronic circuit preferably further comprises a fourth switching element inserted into the path for flowing current controlled by the driving transistor to the element to be driven when switched on and for interrupting the corresponding current when switched off. According to this structure, it is possible to control the time required for flowing the current controlled by the driving transistor to the element to be driven by switching the fourth switching element on or off.

According to the electronic circuit comprising the fourth switching element, it is preferable that the first and fourth switching elements be independently switched on or off. According to this structure, since it is possible to use the control line that controls the switching on or off of the fourth switching element as the control line that controls the switching on or off of the first switching element, it is possible to reduce the number of wiring lines. Here, the first to fourth switching elements preferably have channel-type transistors complementary to each other.

According to this electronic circuit, the element to be driven is preferably an electro-optical element. In particular, the element to be driven is preferably an organic electroluminescent diode element. On the other hand, the electro-optical device according to the present invention preferably has the plurality of electronic circuits as pixel circuits. Also, an electronic apparatus according to the present invention preferably comprises the above-described electro-optical device.

DETAILED DESCRIPTION OF PREFERRED EMBODIMENTS

Figure 1:
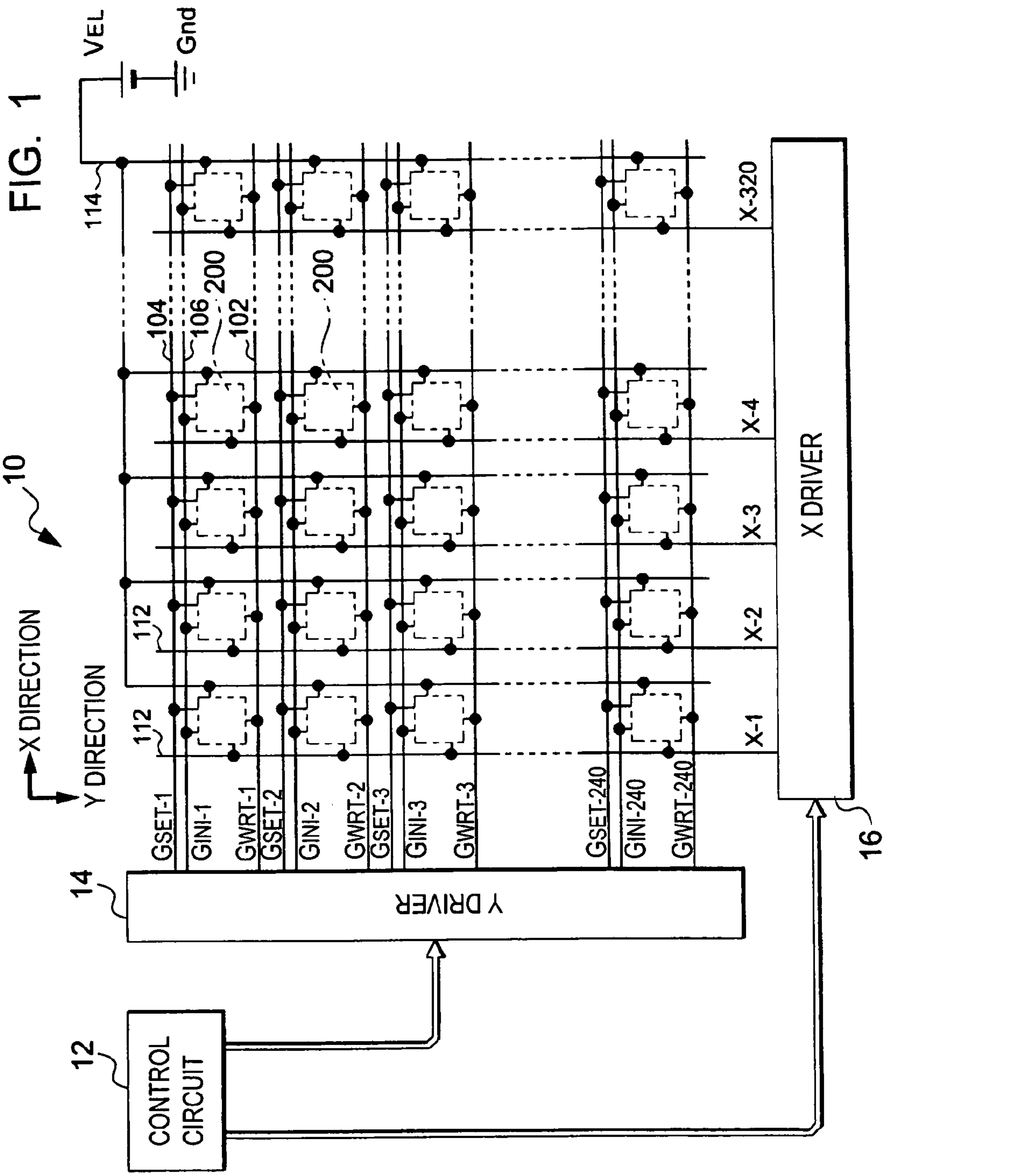
FIG. 1 is a block diagram illustrating the structure of an electro-optical device according to an embodiment of the present invention.

Preferred embodiments of the present invention will now be described with reference to the drawings. FIG. 1 is a block diagram illustrating the structure of an electro-optical device according to the present embodiment.

As illustrated in FIG. 1, in an electro-optical device 10, pixel circuits 200 including OLED elements are arranged in a matrix of 240 rows×320 columns. In the present embodiment, the amount of current to each of the OLED elements is controlled for each of the pixel circuits 200 to perform the grayscale display of a predetermined image. In the present embodiment, the pixel circuits 200 are arranged in a matrix of 240 rows×320 columns. However, the present invention is not limited to the above arrangement.

In the arrangement of the pixel circuits 200, scanning lines 102, initialization control lines 104, and on/off control lines 106 are provided in the number of 240 to correspond to the number of rows of the matrix and to extend in the X direction. Each of the scanning lines 102, each of the initialization control lines 104, and each of the on/off control lines 106 form a group to be used for the pixel circuits 200 of a row.

Scanning signals $G_{WRT\text{-}1}$, $G_{WRT\text{-}2}$, $G_{WRT\text{-}3}$, . . . , and $G_{WRT\text{-}240}$ are supplied to the scanning lines 102 of a first row, a second row, a third row, . . . , and a 240th row. Here, for purposes of the description, the scanning signal supplied to the scanning line 102 of an ith row (i is an integer that satisfies the condition $1 \leqq i \leqq 240$) is denoted by $G_{WRT\text{-}i}$. A control signal $G_{INI\text{-}i}$ is supplied to the initialization control line 104 of an ith row and a control signal $G_{SET\text{-}i}$ is supplied to the on/off control line 106 of an ith row. The scanning lines 102, the initialization control lines 104, and the on/off control lines 106 are driven by a Y driver 14.

On the other hand, data lines 112 are provided in the number of 320 to correspond to the number of columns of the matrix to extend in the Y direction. Also, one data line 112 is used as the pixel circuit 200 for a column. An X driver 16 supplies data signals X-1, X-2, X-3, . . . , and X-320 to the data lines 112 of a first column, a second column, a third column, . . . , and a 320th column and drives the data lines 112. Here, for purposes of the description, the data signal supplied to the 0 is an integer that satisfies the condition $1 \leqq j \leqq 320$) data line 112 of a jth column is denoted by X−j.

A power line 114, to which a higher voltage $V_{EL}$ of a power source is applied, are connected to all of the pixel circuits 200. In FIG. 1, the power line 114 extends in the Y direction in the arrangement of the matrix, however, may extend in the X direction. Although not shown in FIG. 1, all of the pixel circuits 200 are commonly grounded to a lower voltage Gnd of the power source.

A control circuit 12 supplies clock signals to the Y driver 14 and to the X driver 1 to control both drivers and supplies image data that defines each grayscale in each pixel to the X driver 16.

Figure 2:
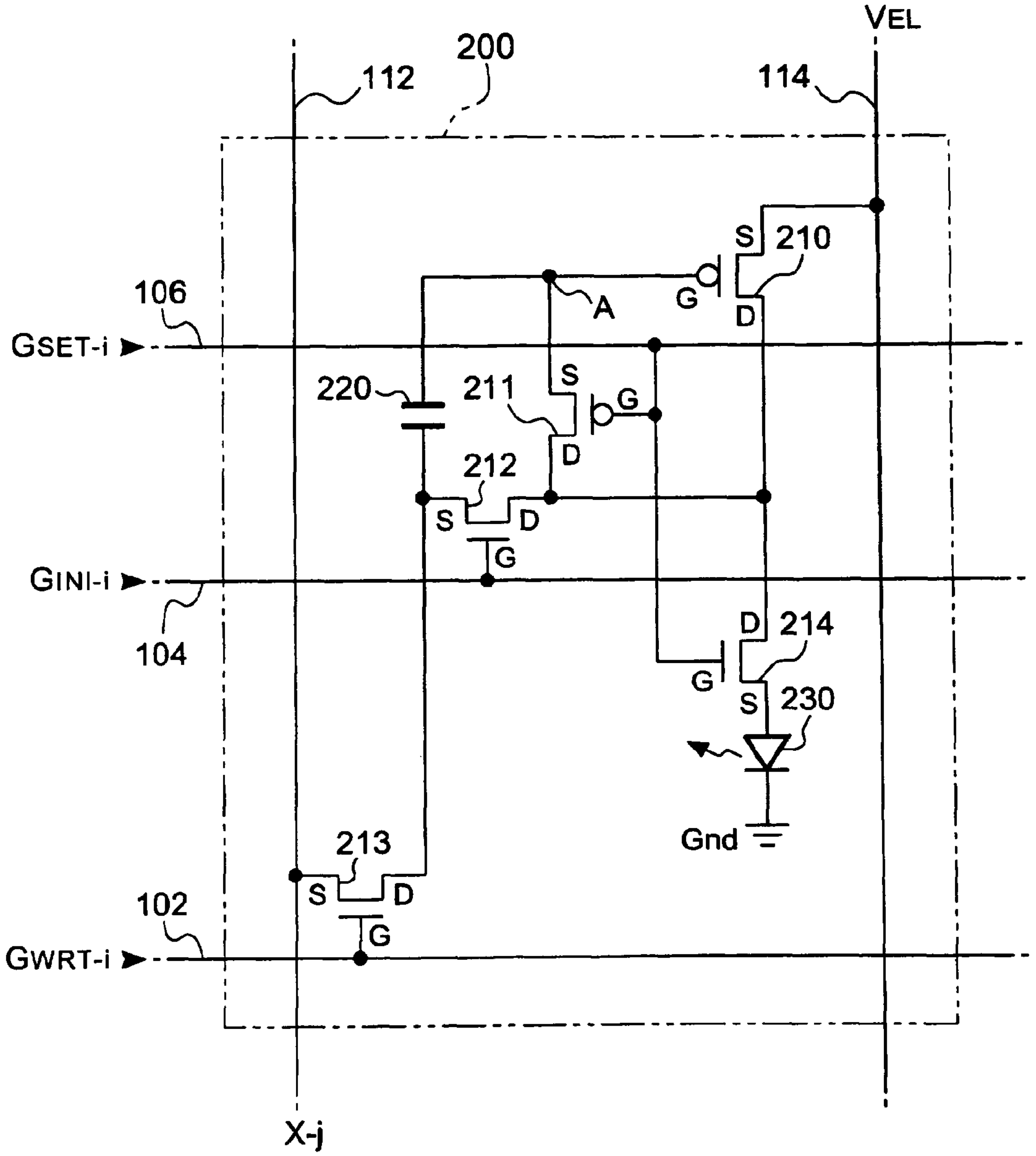
FIG. 2 is a view illustrating the structure of the pixel circuit of an electro-optical device.

Next, the electrical structure of the pixel circuit 200 will be described in detail. FIG. 2 is a circuit diagram illustrating the structure of the pixel circuit 200 positioned in the ith row and in the jth column.

As illustrated in FIG. 2, the pixel circuit 200 includes a driving transistor 210, transistors 211, 212, 213, and 214 that function as switching elements, a capacitor 220 that functions as a voltage storage element, and an OLED element 230 that is an electro-optical element.

First, the P-channel-type driving transistor 210 is connected to the power line 114. The drain of the driving transistor 210 is connected to the drain of the P-channel-type transistor 211 and to the drains of the N-channel-type transistors 212 and 214.

The source of the transistor 214 is connected to the anode of the OLED element 230, and the cathode of the OLED element 230 is grounded to the lower voltage Gnd of the power source. Thus, the OLED element 230 is inserted into a path between the higher voltage $V_{EL}$ of the power source and the lower voltage Gnd of the power source together with the driving transistor 210 and the transistor 214.

On the other hand, the gate of the driving transistor 210 is connected to one end of the capacitor 220 and to the source of the transistor 211. For purposes of the description, the gate of the driving transistor (one end of the capacitor 220) is used as a node A.

The gates of the transistors 211 and 214 are commonly connected to the on/off control line 106 of the ith row. Thus, the transistors 211 and 214 having different channel types are independently switched on or off in accordance with the logic level of the on/off control line 106.

The source of the transistor 212 is connected to the other end of the capacitor 220 and to the drain of the N-channel-type transistor 213. The gate of the transistor 212 is connected to the initialization control line 104 of the ith row. The source of the transistor 213 is connected to the data line 112 of the jth column and the gate of the transistor 213 is connected to the scanning line 102 of the ith row.

Although not directly related to the present invention, the pixel circuits 200 arranged in a matrix are formed on a transparent substrate such as glass together with the scanning lines 102 and the data lines 112. Thus, the driving transistor 210 and the transistors 211, 212, 213, and 214 as switching elements are comprised of thin film transistors (TFTs) by a polysilicon process. The OLED element 230 is formed on the substrate using a transparent electrode film such as indium tin oxide (ITO) as an anode and a film made of elementary metals such as aluminum and lithium or a laminated film thereof as a cathode with a light emitting layer interposed therebetween.

Figure 3A:
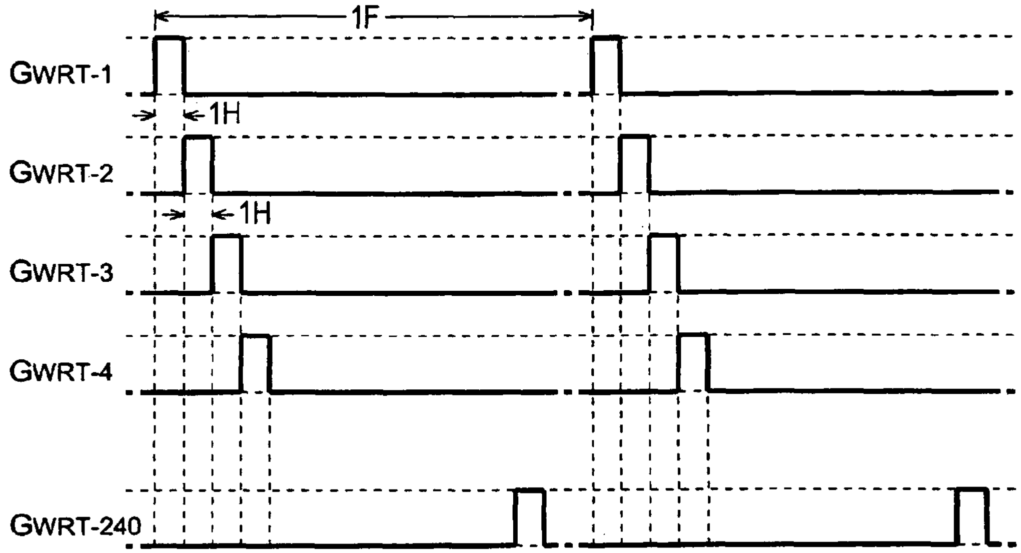
FIG. 3 is a timing chart illustrating the operation of the pixel circuit.
Figure 3B:
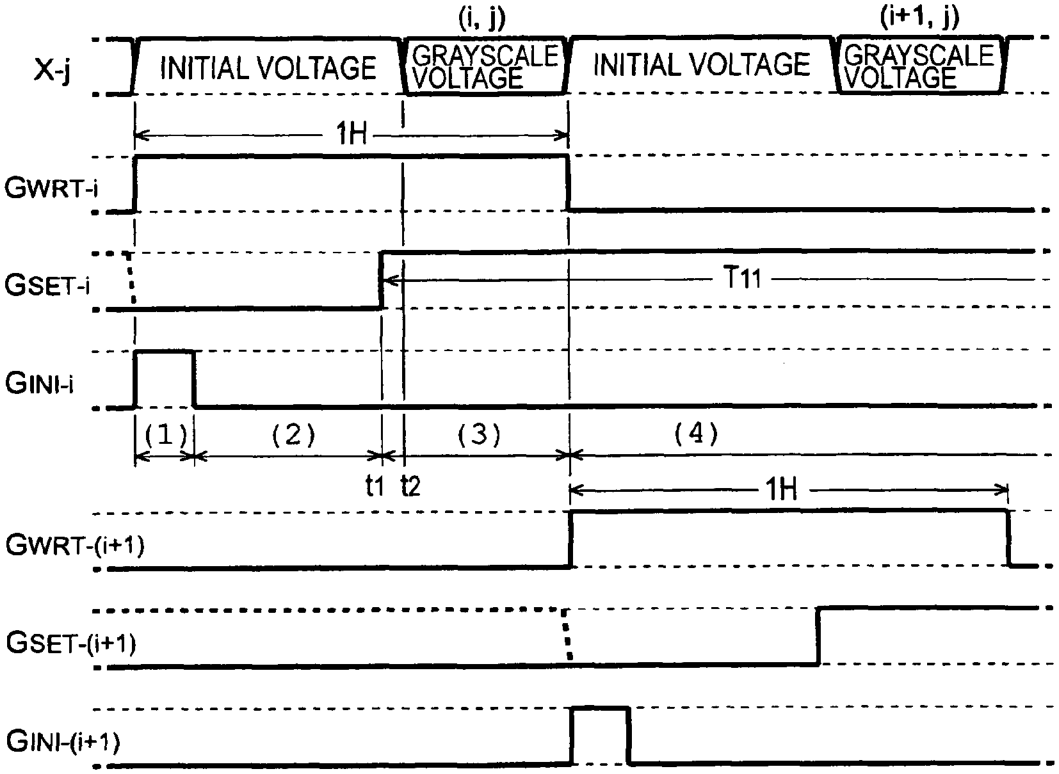

Next, the operation of the electro-optical device 10 will be described. FIG. 3(*a*) is a timing chart illustrating the operation of the electro-optical device 10 in a vertical scanning period. FIG. 3(*b*) is a timing chart illustrating the operation of the electro-optical device 10 in a horizontal scanning period.

First, as illustrated in FIG. 3(*a*), the Y driver 14 sequentially selects the scanning lines 102 of the first row, the second row, the third row, . . . , and the 240th row by one from the start of the one vertical scanning period (1F) for every vertical scanning period (1H) and makes the scanning signals of the selected scanning lines 102 be at an H level and the scanning signals of the other scanning lines be at an L level.

Here, with attention paid to a horizontal scanning period (1H) in which the scanning line 102 of the ith row is selected, the operation in the horizontal scanning period and after the horizontal scanning period will be described with reference to FIGS. 4 to 8 together with FIG. 3(*b*).

As illustrated in FIG. 3(*b*), in the horizontal scanning period (1H) in which the scanning line 102 of the ith row is selected, the scanning signal $G_{WRT\text{-}i}$ supplied to the corresponding scanning line 102 is at the H level. The one horizontal scanning period (1H) is roughly divided into three periods (1), (2), and (3).

First, in the period (1), the Y driver 14 makes the control signal $G_{SET\text{-}i}$ be at the L level and the control signal $G_{INI\text{-}i}$ be at the H level. The X driver 16 makes the data signals supplied to all of the data lines have an initial voltage ($V_{EL}-V_{thp}-\alpha$). Here, $V_{thp}$ is the threshold voltage of the driving transistor 210 and $\alpha$ is zero or a value around zero. Thus, the initial voltage ($V_{EL}-V_{thp}-\alpha$) makes the OLED element 230 darkest when the voltage is applied to the gate of the driving transistor 210 in the case where it is assumed that the transistor 214 is switched on and is a voltage close to the higher voltage $V_{EL}$ of the power source.

Figure 4:
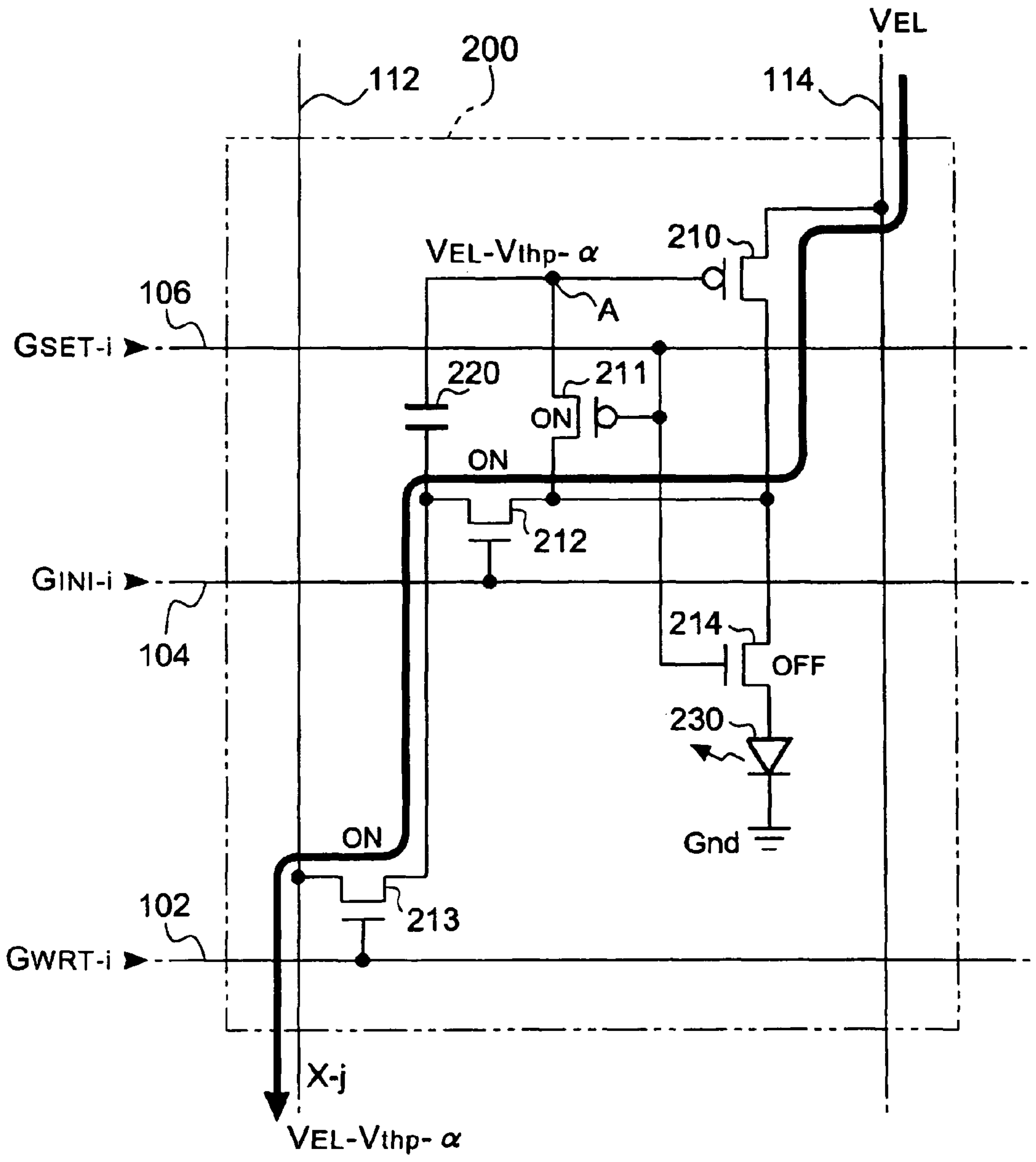
FIG. 4 is a view illustrating the operation of the pixel circuit.

In FIG. 4, in the pixel circuit 200, the control signal $G_{SET\text{-}i}$ is at the L level to switch on the transistor 211 such that the driving transistor 210 functions as a diode and to switch off the transistor 214 such that a current path to the OLED element 230 is interrupted. The control signal $G_{INI\text{-}i}$ is at the H level to switch on the transistor 212. Furthermore, the scanning signal $G_{WRT\text{-}i}$ is at the H level to switch on the transistor 213.

Thus, in the pixel circuit 200, as illustrated in FIG. 4, current flows through a path of the power line 114→the driving transistor 210→the transistor 212→the transistor 213→the data line 112. That is, although a voltage difference is small, current flows from the power line 114 to the data line 112. At this time, since the transistors 211 and 212 are switched on and both ends of the capacitor 220 are short-circuited, time loss caused by the charge and discharge of the capacitor 220 is not generated. Thus, the node A, that is, the gate of the driving transistor 210 has the initial voltage ($V_{EL}-V_{thp}-\alpha$) almost equal to the voltage of the data line 112 in a relatively short time.

In the period (2), the Y driver 14 maintains the control signal $G_{SET\text{-}i}$ at the L level and returns the control signal $G_{INI\text{-}i}$ to the L level. The X driver 16 maintains the data signal to have the initial voltage ($V_{EL}-V_{thp}-\alpha$).

Figure 5:
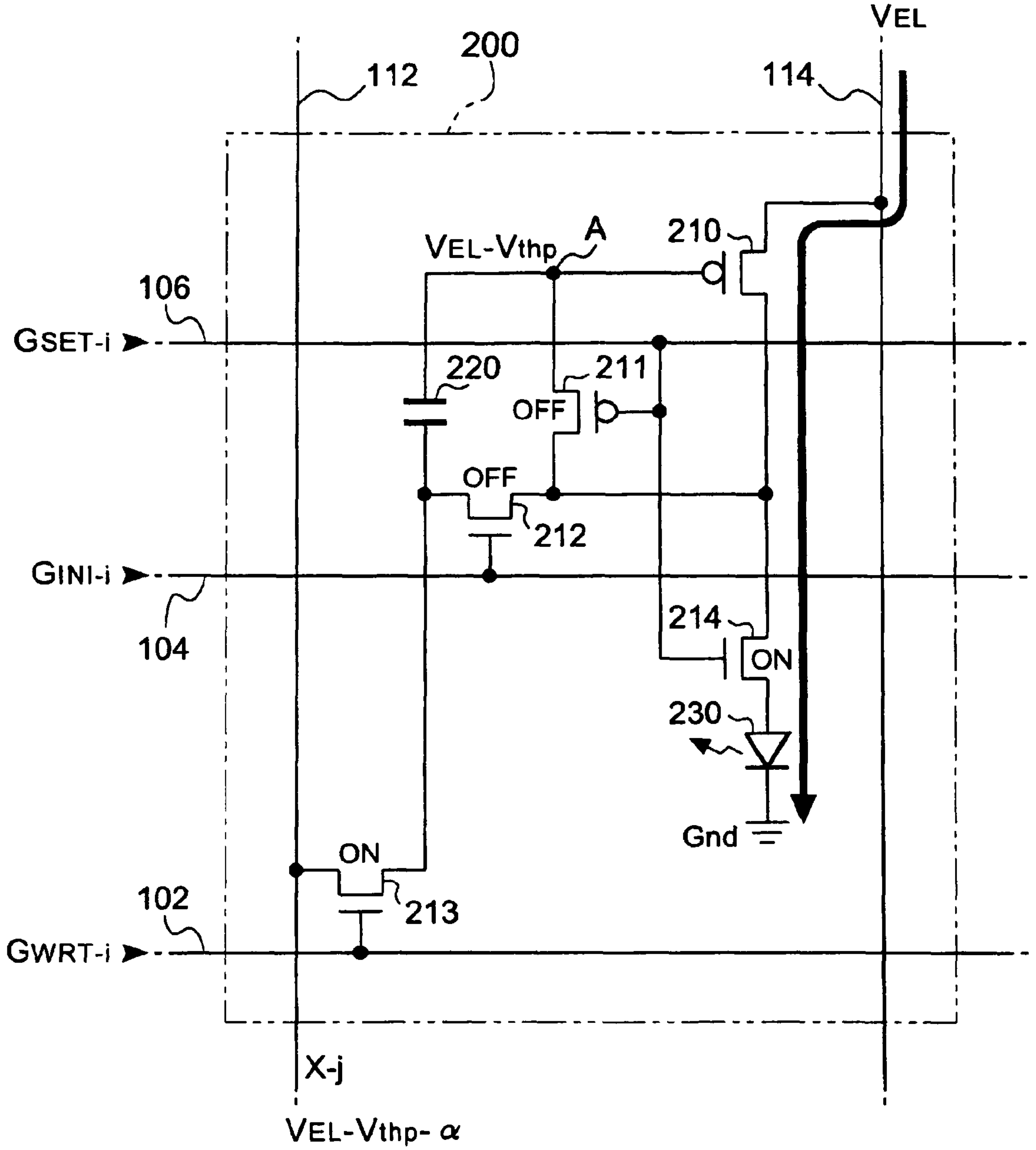
FIG. 5 is a view illustrating the operation of the pixel circuit.

In this state, in the pixel circuit 200, as illustrated in FIG. 5, since the transistor 211 is continuously switched on such that the driving transistor 210 continuously functions as a diode. However, since the control signal $G_{INI\text{-}i}$ is at the L level to switch off the transistor 212, the current path from the power line 114 to the data line 112 is interrupted.

On the other hand, since the transistor 211 is continuously switched on, the voltage of one end of the capacitor, that is, the voltage of the node A, changes to a voltage ($V_{EL}-V_{thp}$) obtained by reducing the higher voltage $V_{EL}$ of the power source by the threshold voltage $V_{thp}$ of the driving transistor 210. Since the other end of the capacitor 220 continuously has the initial voltage ($V_{EL}-V_{thp}-\alpha$) of the data line 112 due to the switching on of the transistor 213, the voltage in the node A changes in accordance with the charge and discharge of the capacitor 220 (and the gate capacitance of the driving transistor 210). However, since the charge of the capacitor 220 is previously cleared by the short circuit in the period (1) and the change in the voltage of the node A from the period (1) is zero or α around zero, it does not take long until the voltage of the node A reaches ($V_{EL}-V_{thp}$) in the period (2). Thus, it may be considered that the voltage of the node A at the timing of the end of the period (2) is ($V_{EL}-V_{thp}$).

Subsequently, the Y driver 14 transits the control signal $G_{SET-i}$ to the H level until the lapse of a period $T_{11}$ from the start timing $t_1$ of the period (3). The X driver 16 maintains the data signal to have the initial voltage ($V_{EL}-V_{thp}-\alpha$) immediately after the start timing $t_1$.

Figure 6:
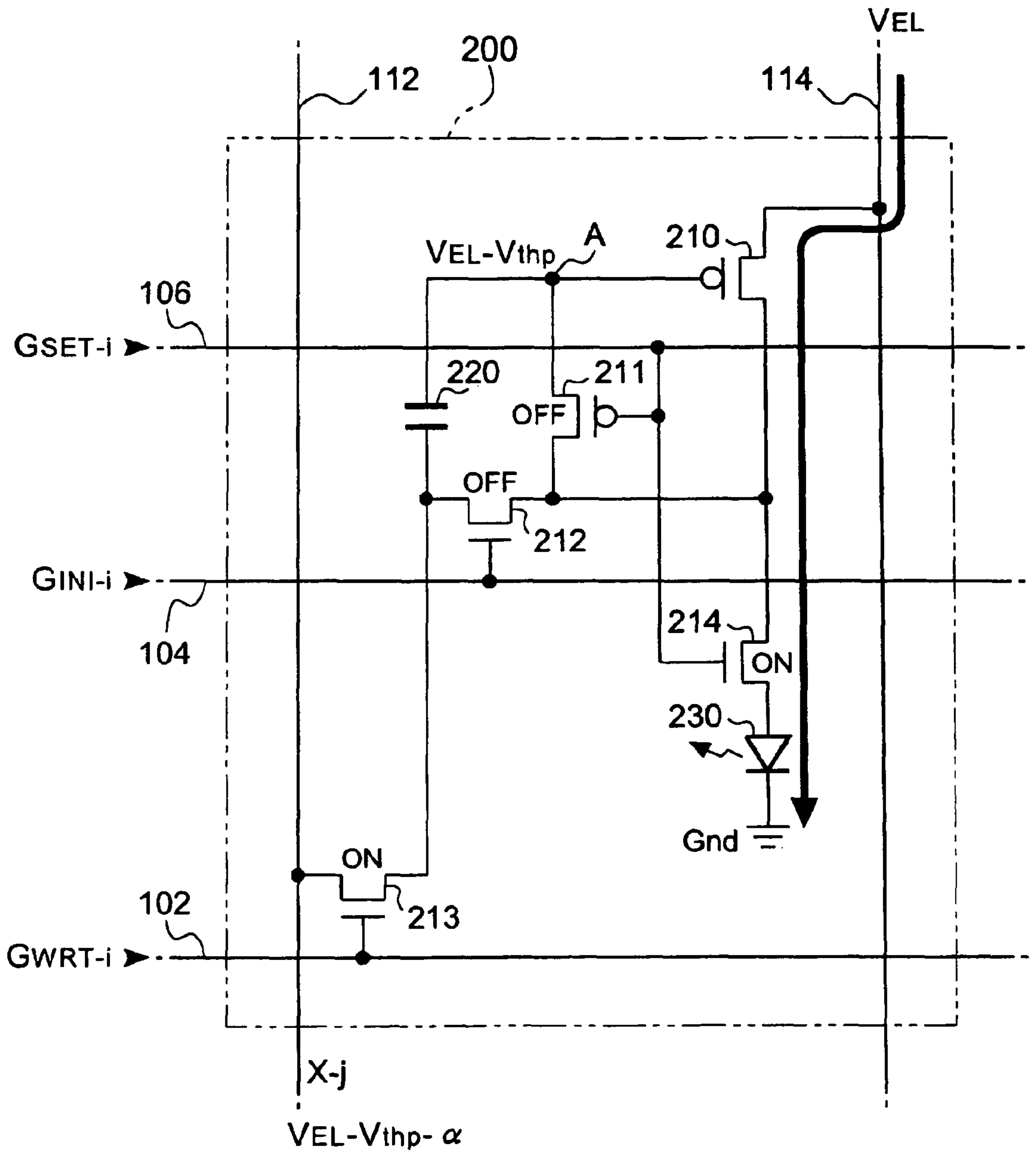
FIG. 6 is a view illustrating the operation of the pixel circuit.

In the pixel circuit 200, as illustrated in FIG. 6, since the transistor 211 is switched off and the transistor 214 is switched on, the driving transistor 210 flows the current corresponding to the gate voltage to the OLED element 230. At this time, since the gate voltage is ($V_{EL}-V_{thp}$), which is almost the higher voltage of the power source, little current flows through the OLED element 230. Thus, ($V_{EL}-V_{thp}$) is referred to as an off voltage.

Next, the X driver 16 switches the voltage of the data signal X-j from the initial voltage ($V_{EL}-V_{thp}-\alpha$) to the voltage ($V_{EL}-V_{thp}-\alpha-V_{gray}$) at the timing $t_2$ to reduce the voltage by the voltage $V_{gray}$. Here, $V_{gray}$ is determined by the image data corresponding to the pixel in the i row and j column and is close to zero as the OLED element 230 of the corresponding pixel is darker. Thus, the voltage ($V_{EL}-V_{thp}-\alpha-V_{gray}$) is the grayscale voltage corresponding to the amount of the current to flow through the OLED element 230.

Figure 7:
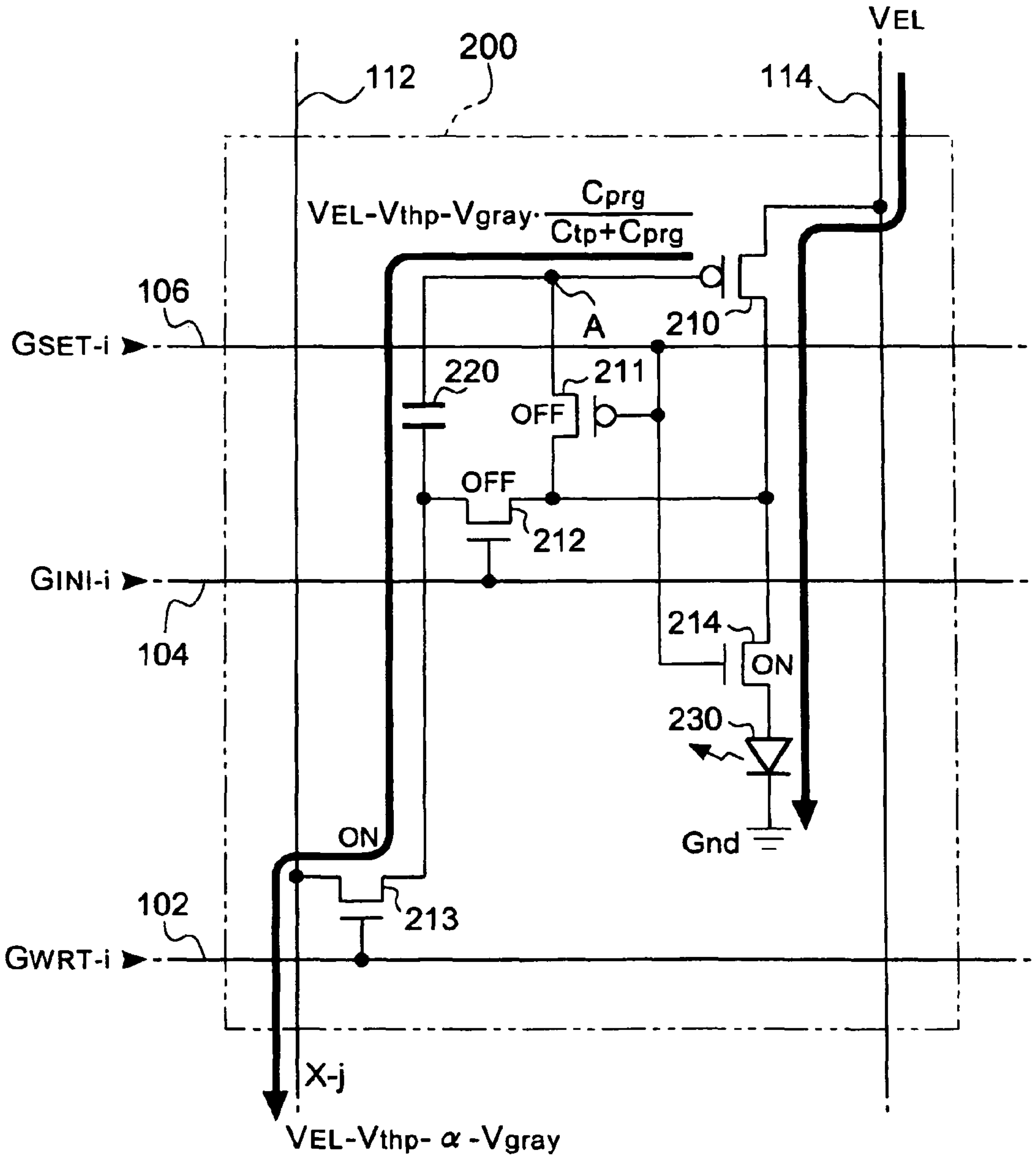
FIG. 7 is a view illustrating the operation of the pixel circuit.

In this state, in the pixel circuit 200, as illustrated in FIG. 7, since the transistor 211 is switched off, one end (the node A) of the capacitor 220 is stored only by the gate capacitance of the driving transistor 210. Thus, the voltage of the node A is reduced from the off voltage ($V_{EL}-V_{thp}$) by the amount obtained by dividing $V_{gray}$ that is the change in the voltage in the other end of the capacitor 220 (that is, the reduction of the voltage of the data signal X-j) by the capacitance ratio of the capacitor 220 to the gate capacitance of the driving transistor 210. Specifically, when the magnitude of the capacitor 220 is $C_{prg}$ and the gate capacitance of the driving transistor 210 is $C_{tp}$, the voltage of the node A is reduced from the off voltage ($V_{EL}-V_{thp}$) by $\{V_{gray}\cdot G_{prg}/(C_{tp}+C_{prg})\}$ such that the voltage $\{V_{EL}-V_{thp}-V_{gray}\cdot C_{prg}/(C_{tp}+C_{prg})\}$ is written in the node A.

The current corresponding to the voltage written in the node A flows through the OLED element 230 such that light emission starts. At this time, the voltage written in the node A is the target voltage corresponding to the current to flow through the OLED element 230.

According to the present embodiment, firstly, since the voltage of the data line 112 changes from the initial voltage ($V_{EL}-V_{thp}-\alpha$) close to the higher voltage of the power source to the grayscale voltage ($V_{EL}-V_{thp}-\alpha-V_{gray}$) when the target voltage is written in the node A, that is, since the voltage of the data line 112 changes to the grayscale voltage in the state of being pre-charged to the initial voltage, even if the data line 112 has parasitic capacitance, the change is performed in a short time. Secondly, the voltage of the node A is maintained as the off voltage ($V_{EL}-V_{thp}$) by applying the initial voltage and changes to the target voltage $\{V_{EL}-V_{thp}-V_{gray}\cdot C_{prg}/(C_{tp}+C_{prg})\}$ corresponding to the grayscale voltage. That is, the target voltage is written in the gate of the driving transistor in a state where current flows through the driving transistor. Thus, compared with a conventional structure in which the voltage of the drain of the driving transistor increases in a state where the driving transistor is switched off such that the target voltage is written to the gate of the driving transistor, the time required for the writing is reduced.

When the selection of the scanning line 102 in the I row is completed, the Y driver 14 makes the scanning signal $G_{WRT-i}$ be at the L level and the next scanning signal $G_{WRT-(i+1)}$ be at the H level. Thus, the operation in the periods (1), (2), and (3) is repeated with respect to the pixel circuits 200 in the (i+1) row.

In the pixel circuits 200 in the ith row, even if the scanning signal $G_{WRT-i}$ in the ith row is at the L level, the control signal $G_{SET-i}$ is maintained at the H level. Thus, the period in which the control signal $G_{SET-i}$ is at the H level even if the scanning signal $G_{WRT-i}$ is at the L level is referred to as the period (4).

Figure 8:
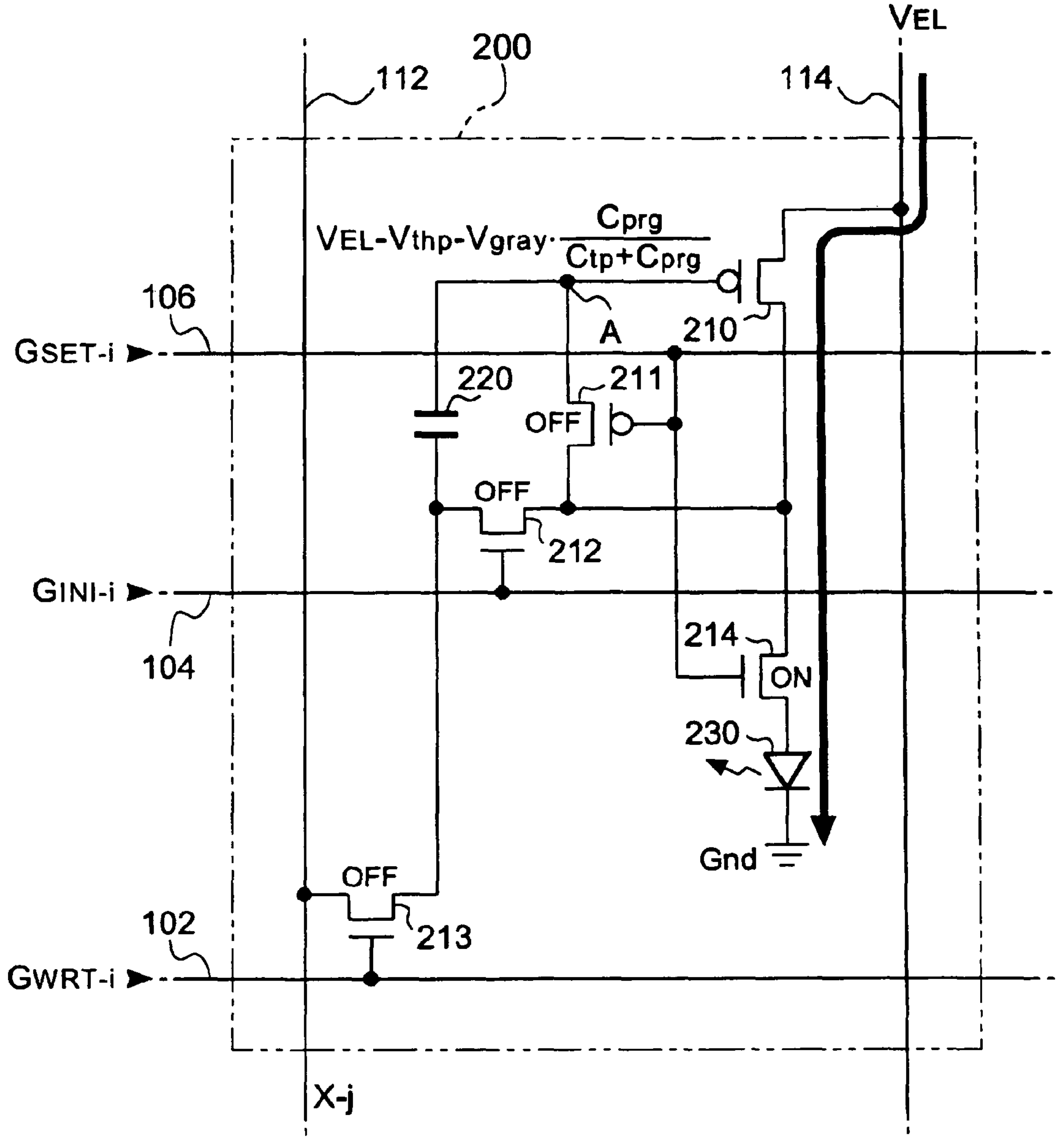
FIG. 8 is a view illustrating the operation of the pixel circuit.

As illustrated in FIG. 8, in the period (4), the transistor 213 is switched off, however, the voltage of the node A is maintained at the target voltage $\{V_{EL}-V_{thp}-V_{gray}\cdot C_{prg}/(C_{tp}+C_{prg})\}$ by the gate capacitance of the driving transistor 210 (and the capacitor 220).

Thus, in the period (4), since the current corresponding to the target voltage continuously flows through the OLED element 230, the OLED element 230 continuously emits light to the image data by the designated brightness.

When the control signal $G_{SET-i}$ is at the L level with the lapse of the period $T_{11}$ from the start timing $t_1$ of the period (3), the transistor 214 is switched off and a current path to the OLED element 230 is interrupted to turn off the OLED element 230.

Here, the Y driver 14 controls the period $T_{11}$ such that the period is the same with respect to all of the control signals from the control signal $G_{SET-i}$ to the control signal $G_{SET-240}$, that is, with respect to all of the rows from the first row to the 240th row. Thus, since the ratio of the light emission period occupied by the vertical scanning period is uniform with respect to all of the OLED elements 230, it is possible to control the brightness of a display screen such that the entire image is bright when the period $T_{11}$ is long and that the entire image is dark when the period $T_{11}$ is short.

Figure 10A:
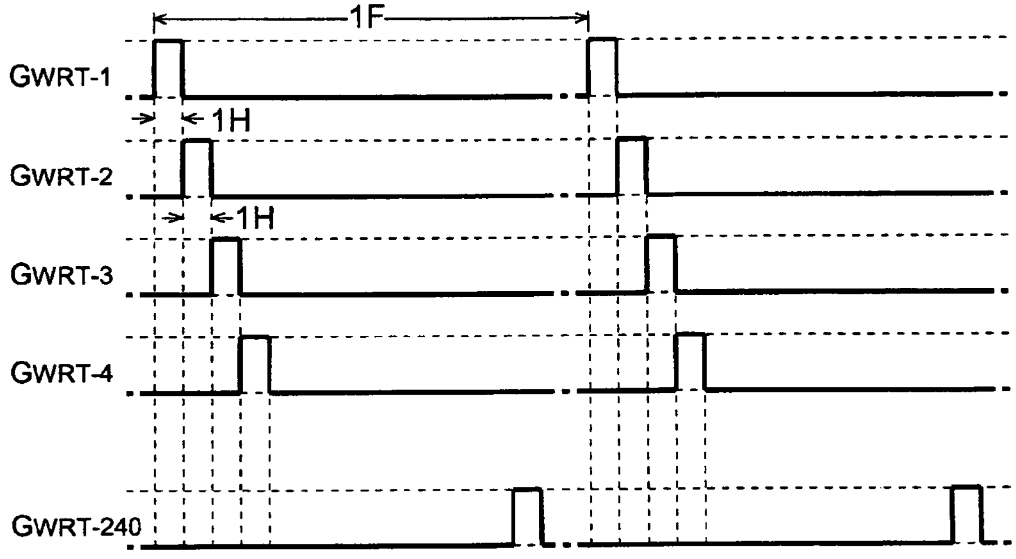
FIG. 10 is a timing chart illustrating the operation of the pixel circuit.
Figure 10B:
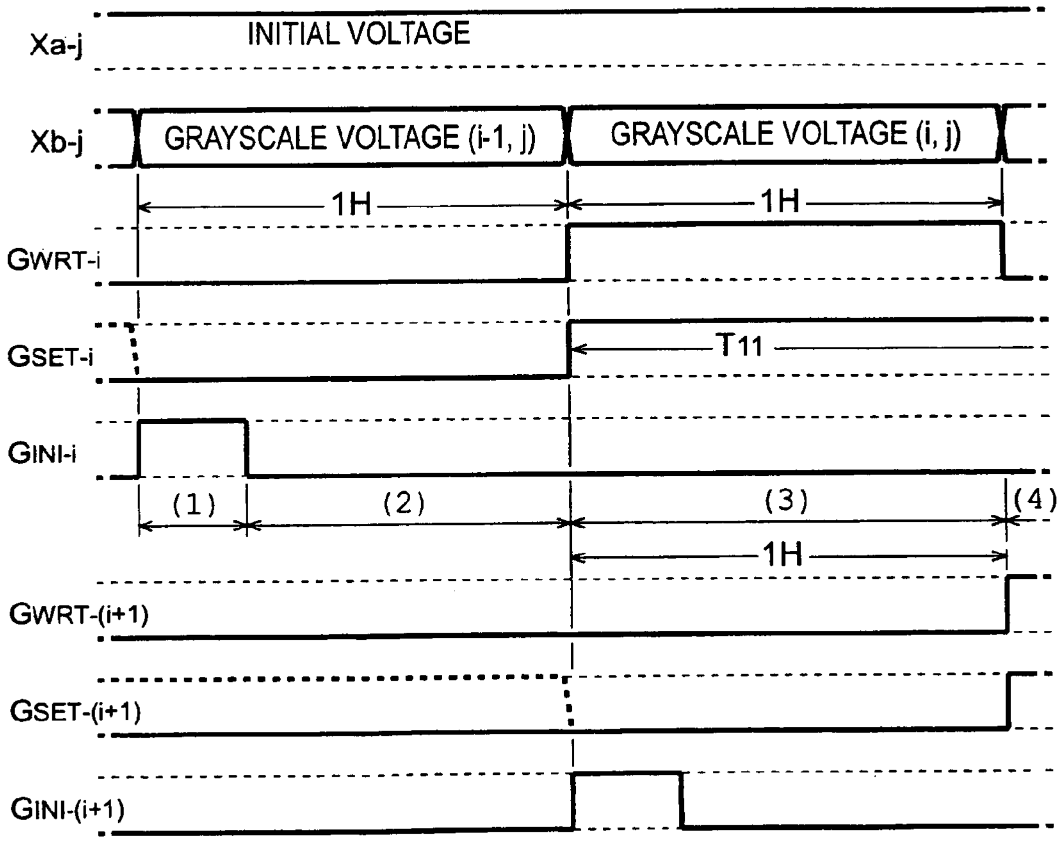

Also, since the upper limit of the period $T_{11}$ is the entire region of the period other than the periods (1) and (2) in the one vertical scanning period (1F), the control signal $G_{SET-i}$ may be at the H level at the timing where the level of the scanning signal $G_{WRT-i}$ is transited from the L level to the H level, that is, until the scanning line 102 of the ith row is selected again with the lapse of the one vertical scanning period (1F), which is marked with the dashed lines in FIG. 3 (which is also true of FIG. 10 as mentioned later).

The above description is true of not only the pixel circuit 200 of the jth column but also all of the pixel circuits 200 from the pixel circuit 200 of the first column to the pixel circuit 200 of the 320th column.

Also, in the pixel circuit 200 in the ith row, when the scanning line 102 in the ith row is selected, the operation in the periods (1), (2), and (3) is performed. When the selection of the scanning line 102 in the ith row is completed, the operation in the period (4) is performed. Thus, the operation in the periods (1), (2), and (3) is performed every row in the order of the first row, the second row, the third row, . . . , and the 240th row, however, the operation in the period (4) is repeatedly performed for two or more rows.

According to the present embodiment, in the period (1), the initial voltage is written in the node A through the transistors 213, 212, and 211 in a state where the function of storing the voltage of the capacitor 220 is nullified. In the period (2), the voltage of the node A is maintained at the off voltage in a self-compensating manner. In the period (3), the target voltage is written in the node A. In the period (4), the driving transistor 210 continuously flows current to the OLED element 230 using the written target voltage as the gate voltage. Thus, since the target voltage can be rapidly written in the gate of the driving transistor 210, it is possible to easily improve resolution and to enlarge the size of the electro-optical device.

Also, in the present embodiment, the function of the transistor 211 is different from the function of the transistor 214 in that the transistor 211 determines whether to make the driving transistor 210 a diode and the transistor 214 determine whether to flow current to the OLED element 230. Thus, the transistor 211 and the transistor 214 must be independently controlled by means of separate control lines. However, in the present embodiment, both transistors 211 and 214 are controlled by means of a common control line by making the channel types of both transistors 211 and 214 different from each other to reduce the number of control lines by one.

In the present embodiment, the timing $t_2$, at which the voltage of the data line 112 is switched from the initial voltage to the grayscale voltage, is delayed from the start timing $t_1$ of the period (3), however, may be the same as the timing $t_1$. At any rate, the grayscale voltage is preferably applied to the data line such that the node A has the target voltage until the end of the period (3) and it is sufficient if only the voltage of the data line is the grayscale voltage in the latter half of the period (3).

Figure 9:
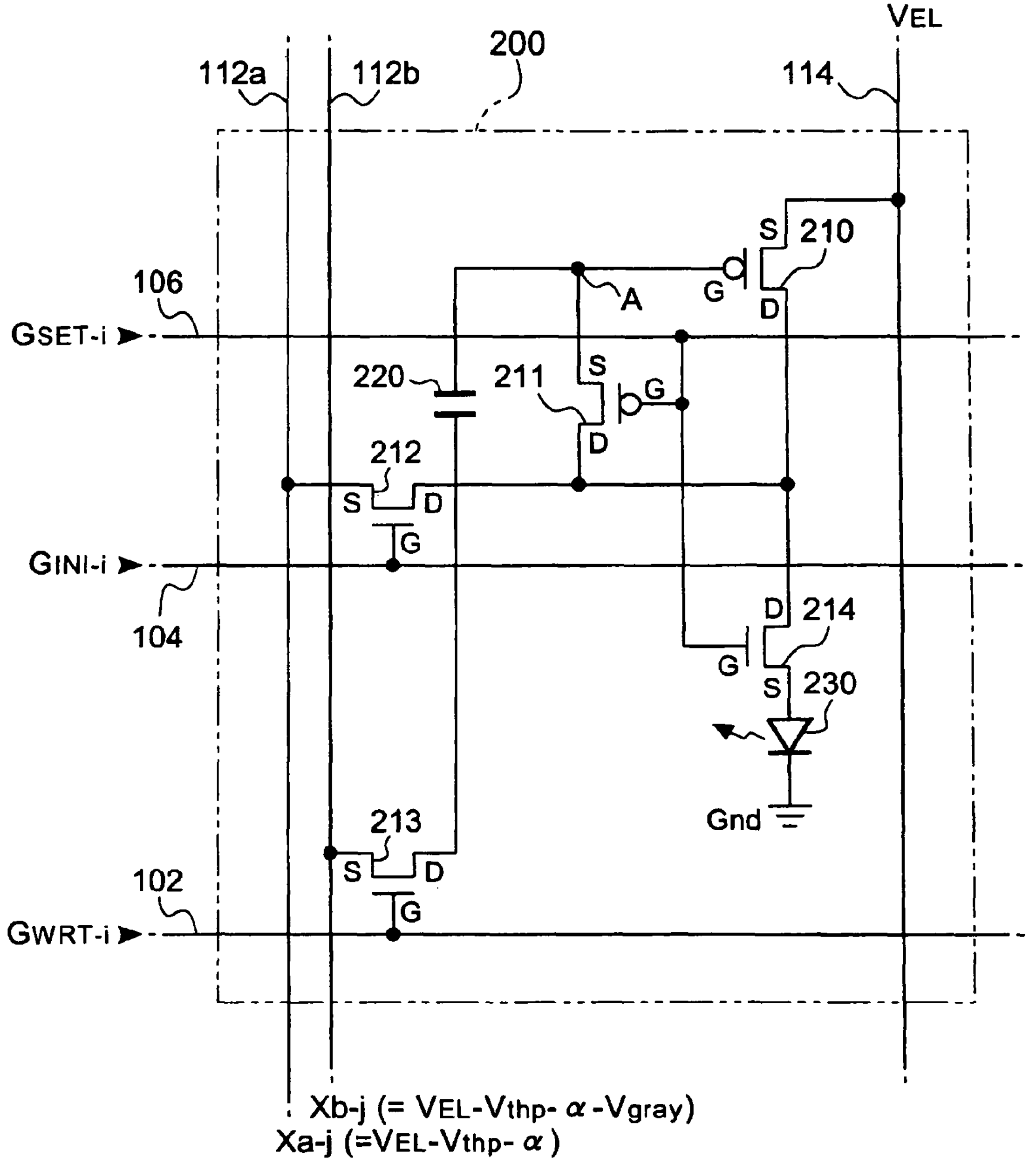
FIG. 9 is a view illustrating another structure of the pixel circuit.

Next, the structure of a pixel circuit different from the pixel circuit according to the present embodiment will now be described. FIG. 9 is a circuit diagram illustrating the structure of a pixel circuit 200.

The pixel circuit 200 illustrated in FIG. 9 is different from the pixel circuit illustrated in FIG. 2 in that the data line 112 in FIG. 2 is divided into an initial voltage supply line 112*a* and a signal line 112*b*, that the source of the transistor 212 is not connected to the other end of the capacitor 220 but to the initial voltage supply line 112*a*, and that the source of the transistor 213 is connected to the signal line 112*b*. The initial voltage is applied to the data line 112 in the period (1) and the grayscale voltage is applied to the data line 112 in the latter half of the period (3). However, in FIG. 9, only the initial voltage is supplied to the initial voltage supply line 112*a* and only the grayscale voltage is supplied to the signal line 112*b*.

In this structure, the initial voltage supply line 112*a* has the initial voltage, which is constant and the X driver 16 supplies the grayscale voltage of the pixel positioned in the selected row to the signal line 112*b* of the corresponding column.

According to the pixel circuit 200 illustrated in FIG. 9, in the period (1), the initial voltage is written in the node A through the transistors 212 and 211 without passing through the capacitor 220. In the period (2), the node A is maintained to have the off voltage in a self-compensating manner. In the period (3), the target voltage is written in the node A. Thus, as illustrated in FIG. 2, it is possible to rapidly write the target voltage in the gate of the driving transistor 210.

In the pixel circuit illustrated in FIG. 2, it is necessary to complete the operation of the periods (1), (2), and (3) in the one horizontal scanning period (1H) in which the scanning signal $G_{WRT-i}$ is at the H level. However, in the pixel circuit 200 illustrated in FIG. 9, since the data line is divided into the initial voltage supply line 112*a* and the signal line 112*b*, the operation of the periods (1) and (2) can be performed prior to the one horizontal scanning period (1H) in which the scanning signal $G_{WRT-i}$ is at the H level.

For example, as illustrated in FIG. 10, the operation of the periods (1) and (2) is performed in the period prior to the timing at which the scanning signal $G_{WRT-i}$ is at the H level by the one horizontal scanning period (1H) such that the operation of the period (3) can be performed in the one horizontal scanning period (1H) at which the scanning signal $G_{WRT-i}$ is at the H level.

Immediately after the period (4) in which the control signal $G_{SET-i}$ is at the L level to turn on the OLED element 230, the operation of the period (1) is performed and the operation of the period (2) may be subsequently performed.

That is, in the pixel circuit 200 illustrated in FIG. 9, since the scanning signal $G_{WRT-i}$ is at the H level, it is possible to perform the operation of the periods (1) and (2) in the period immediately prior to the one horizontal scanning period (1H), in which the OLED element 230 is turned off, and thus to secure enough time for the periods (1) and (2).

However, in the pixel circuit illustrated in FIG. 9, since the number of wiring lines used for one column increases by one compared with the pixel circuit illustrated in FIG. 2, the aperture ratio deteriorates in the case where the electro-optical device 10 has a bottom emission structure, which is disadvantageous.

That is, in the pixel circuit illustrated in FIG. 2, it is not possible to secure enough time for the periods (1) and (2) compared with the pixel circuit illustrated in FIG. 9. However, since the number of wiring lines used for one column may be smaller by one, the aperture ratio improves, which is advantageous.

The present invention is not limited to the above-described embodiment and various modifications can be made.

For example, according to the present embodiment, the grayscale display is performed with respect to pixels of a single color. However, the light emitting layer of the OLED element 230 may be selected to generate colors, i.e., red (R), green (G), and blue (B), with respect to each of three pixels, such that one dot is comprised of the three pixels to display colors. Also, the OLED element 230 is an example of a current-driven element, instead of which another light emission element such as a field emission (FE) element and an LED, an electrophoresis element, and an electrochromic element may be used.

According to the present embodiment, the driving transistor 210 is a P-channel-type, however, may be an N-channel-type. The channel types of the transistors 211, 212, 213, and 214 are not limited to the present embodiment. However, the channel types of the transistors 211 and 214 are preferably determined such that one thereof is a P-channel-type and the other thereof is an N-channel-type.

Furthermore, when the respective transistors are comprised of transmission gates in which the P-channel-type and the N-channel-type are complementarily combined with each other, it is possible to suppress the voltage drop negligibly.

Furthermore, the OLED element 230 may be connected not to the source of the transistor 214 but to the drain of the transistor 214.

Also, in FIG. 9, the transistor 212 is connected to the drain of the transistor 211. However, the transistor 212 may be connected to the source of the transistor 211, that is, directly to the node A.

Next, examples in which the electro-optical device according to the above-described embodiment is applied to in an electronic apparatus will be described.

Figure 11:
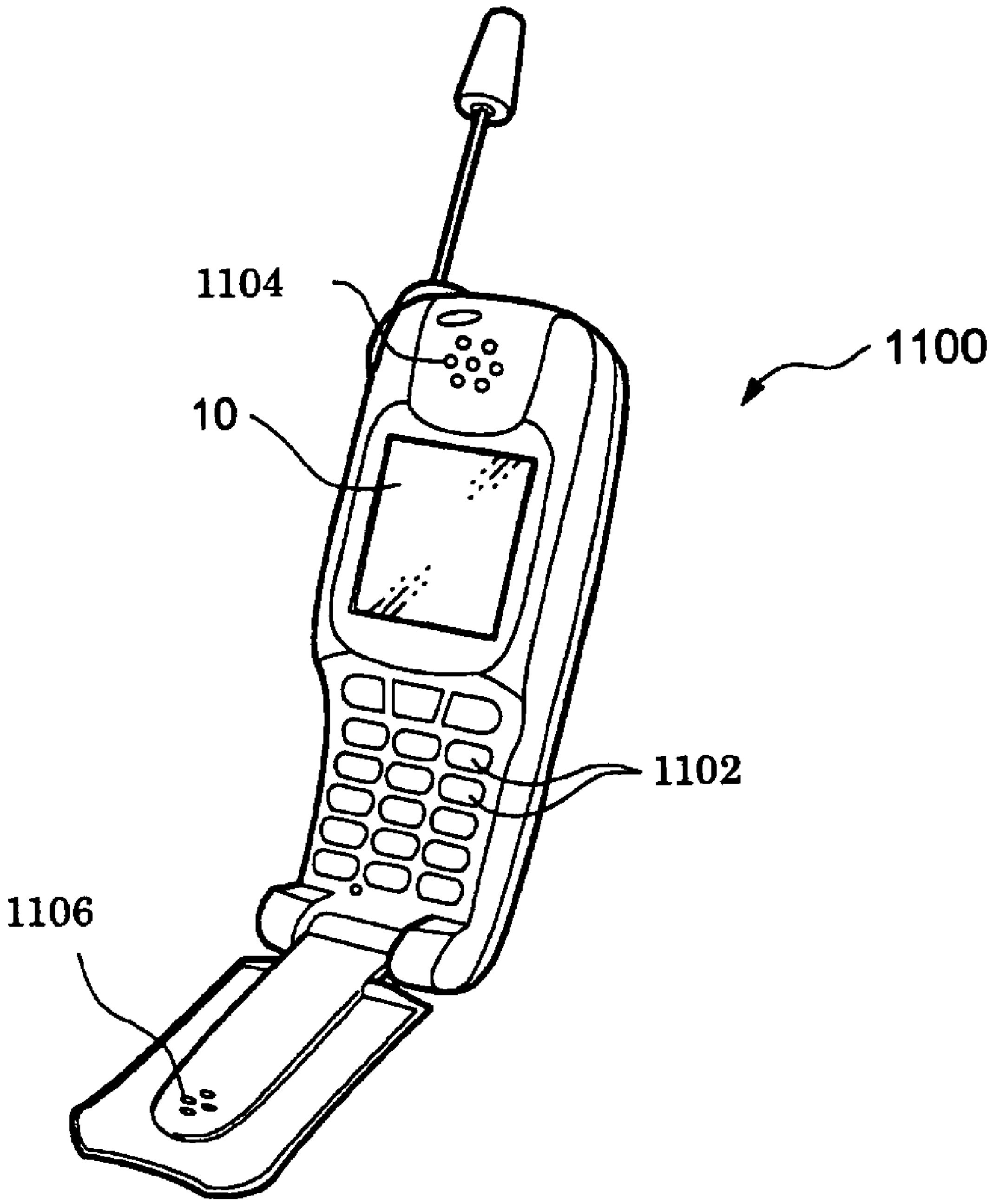
FIG. 11 is a view illustrating a mobile telephone using the electro-optical device.

First, a mobile telephone, in which the above-described electro-optical device 10 is applied to a display portion, will be described. FIG. 11 is a perspective view illustrating the structure of the mobile telephone.

In FIG. 11, a mobile telephone 1100 includes a plurality of operation buttons 1102, an earpiece 1104, a mouthpiece 1106, and the above-described electro-optical device 10 as a display portion.

Next, a digital camera, in which the above-described electro-optical device 10 is used as a finder, will be described.

Figure 12:
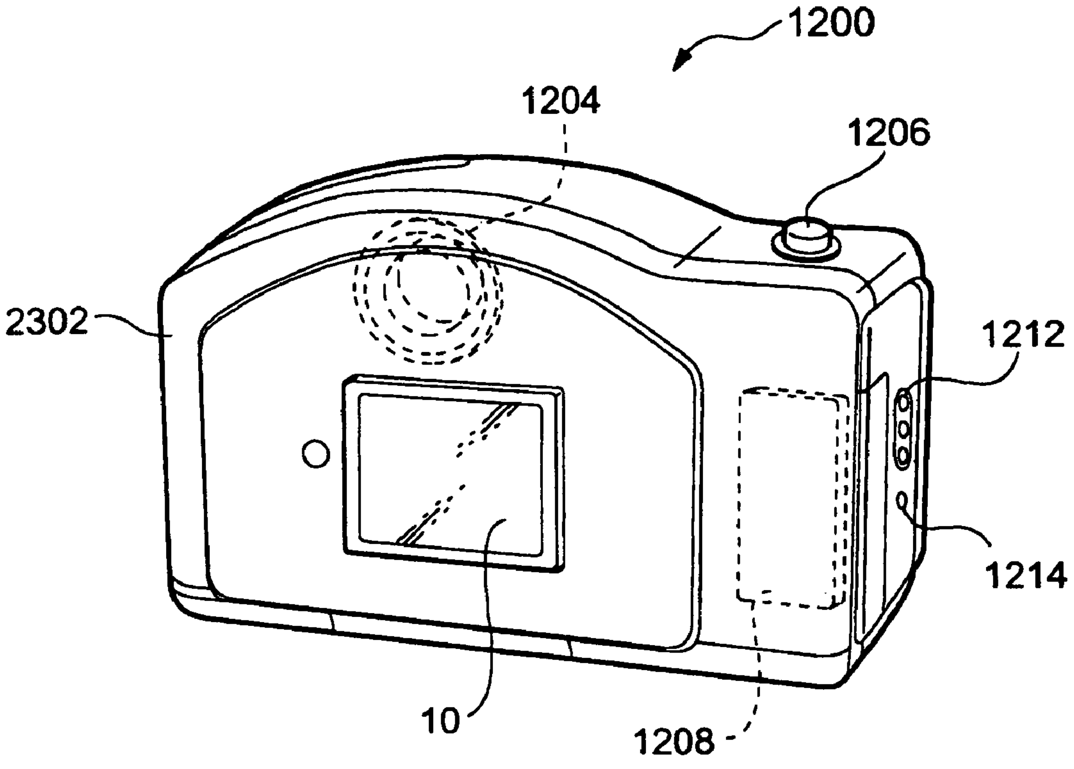
FIG. 12 is a view illustrating a digital camera using the electro-optical device.

FIG. 12 is a perspective view illustrating the backside of the digital camera. Meanwhile, a silver salt camera exposes a film by an optical image of an object, a digital camera 1200 photo-electrically converts the optical image of the object by an image pickup element such as a charge-coupled device (CCD) to generate and store an image pickup signal. Here, in the digital camera 1200, on the backside of the case 1202, the display surface of the above-described electro-optical device 10 is provided. Since the electro-optical device 10 displays images based on the image pickup signal, the electro-optical device 10 functions as a finder that displays an object. A light receiving unit 1204 including an optical lens or a CCD is provided on the front surface (on the backside in FIG. 12) of the case 1202.

When a photographer confirms the object displayed by the electro-optical device 10 and presses a shutter button 1206, the image pickup signal of the CCD at the point of time is transmitted to and stored in the memory of a circuit substrate 1208. In the digital camera 1200, on the side surface of the case 1202, a video signal output terminal 1212 for displaying external images and an input and output terminal 1214 for data communication are provided.

The electronic apparatus includes a television set, a view-finder-type or monitor-direct-view-type video tape recorder, a car navigator, a pager, an electronic organizer, a calculator, a word processor, a workstation, a picture telephone, a POS terminal, and an apparatus including a touch panel as well as the mobile telephone of FIG. 11 and the digital camera of FIG. 12. Also, it is apparent that the above-described electro-optical device can be used as the display portions of the above-described various electronic apparatuses.

What is claimed is:

1. An electronic circuit comprising:

a power line;

a data line; and a circuit including:

a driven element;

a driving transistor coupled between the power line and the driven element, the driving transistor controlling a level of current flowing through the driven element;

a first switching element coupled between a gate of the driving transistor and a drain of the driving transistor;

a voltage storage element, the voltage storage element having a first end coupled to the gate of the driving transistor and a second end;

a second switching element coupled between the second end and the drain of the driving transistor or the gate of the driving transistor; and a third switching element coupled between the data line and the second end.

2. The electronic circuit according to claim 1, a data signal being applied to the data line in a first period and a initial voltage being applied to the data line in a second period.

3. An electronic circuit comprising:

a power line;

a data line;

an initial voltage supply line; and a circuit including;

a driven element;

a driving transistor coupled between the power line and the driven element, the driving transistor controlling a level of current flowing through the driven element;

a first switching element coupled between a gate of the driving transistor and a drain of the driving transistor;

a voltage storage element, the voltage storage element having a first end coupled to the gate of the driving transistor and a second end;

a second switching element coupled between the second end and the drain of the driving transistor or the gate of the driving transistor;

a third switching element coupled between the data line and the second end; and a fourth switching element coupled between the initial voltage supply line and the drain of the driving transistor.

4. An electro-optical device comprising a plurality of pixel circuits, each of the pixel circuits being the circuit according to claim 1.

5. An electronic apparatus comprising the electro-optical device according to claim 4.

6. An electro-optical device comprising a plurality of pixel circuits, each of the pixel circuits being the circuit according to claim 3.

7. An electronic apparatus comprising the electro-optical device according to claim 6.

8. An electronic circuit comprising:

an electro-optical element;

a driving transistor coupled between the power line and the electro-optical element, the driving transistor including a first terminal, a second terminal, and a channel region formed between the first terminal and the second terminal;

a first switching element coupled between a gate of the driving transistor and a drain of the driving transistor;

a voltage storage element, the voltage storage element having a first electrode coupled to the gate of the driving transistor and a second electrode;

a second switching element coupled between the second electrode and the drain of the driving transistor or the gate of the driving transistor; and a third switching element coupled to the second electrode.

9. An electro-optical device comprising a plurality of pixel circuits, each of the plurality of pixel circuits being the electronic circuit according to claim 8.

10. The electro-optical device according to claim 9, further comprising a plurality of data lines, a data signal being supplied to the second electrode through the third switching element and one data line of the plurality of data lines.

11. The electro-optical device according to claim 9, the electronic circuit further including a fourth switching element coupled between the first terminal and the electro-optical element.

12. The electro-optical device according to claim 9, further comprising a plurality of power lines, one power line of the plurality of power lines being electrically connected to the one data line through the second switching element during at least a part of a first period in which the second switching element is in an on-state.

13. The electro-optical device according to claim 9, further comprising a plurality of power lines, one power line of the plurality of power lines being electrically connected to the one data line through the second switching element and the driving transistor during at least a part of a first period in which the second switching element is in an on-state.

14. The electro-optical device according to claim 9, further comprising a plurality of power lines, the gate of the driving transistor being electrically connected to the one data line through the first switching element during at least a part of a first period in which the third switching element is in an on-state.

15. The electro-optical device according to claim 9, further comprising a plurality of power lines, the gate of the driving transistor being electrically connected to the one data line through the first switching element and the second switching element during at least a part of a first period in which the third switching element is in an on-state.

16. The electro-optical device according to claim 10, the data signal being supplied to the second electrode through the third switching element and the one data line during a second period.

17. The electro-optical device according to claim 10, a gate voltage of the gate of the driving transistor being set by the data signal, and a current having a level corresponding to the gate voltage set by the data signal flowing through the electro-optical element during a third period.

* * * * *